Dec. 31, 1940.    G. V. RYLSKY    2,227,368
ILLUMINATING ADAPTER FOR INSTRUMENTS
Original Filed July 1, 1935
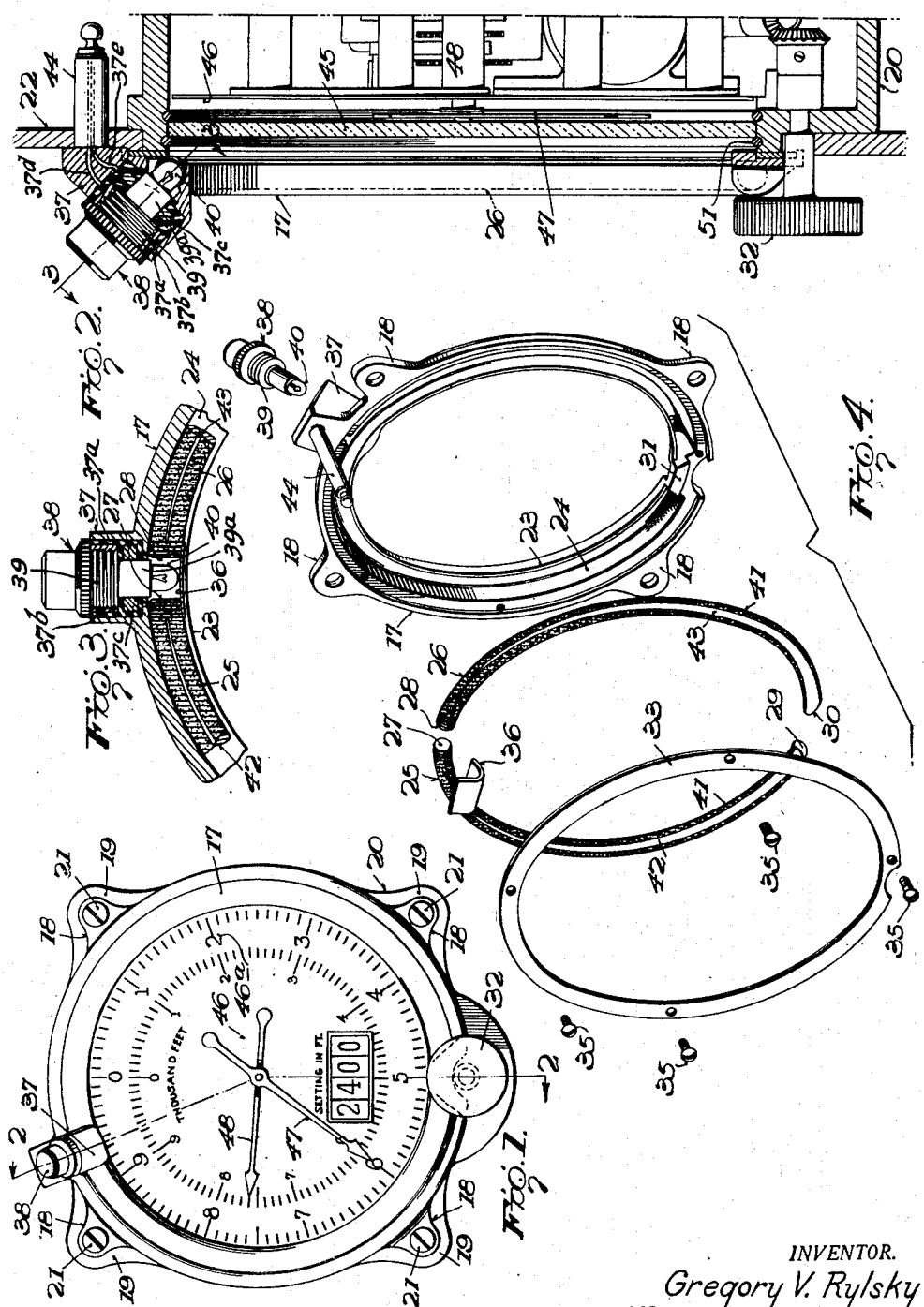
INVENTOR.
Gregory V. Rylsky
BY Stephen Cerstvik
ATTORNEY.

Patented Dec. 31, 1940

2,227,368

UNITED STATES PATENT OFFICE 2,227,368

ILLUMINATING ADAPTER FOR INSTRUMENTS

Gregory V. Rylsky, New York, N. Y., assignor to Bendix Aviation Corporation, South Bend, Ind., a corporation of Delaware Original application July 1, 1935, Serial No. 29,323. Divided and this application May 8, 1937, Serial No. 141,525

8 Claims. (Cl. 240—2.1)

The present invention relates to indicating instruments and/or indicating devices and more particularly to means for illuminating the indicating means thereof and is a division of application Serial No. 29,323, filed July 1, 1935, now Patent No. 2,140,972, Dec. 20, 1938.

One of the objects of the invention is to provide novel means for indirectly illuminating the indicating means of an indicating instrument or other indicating device from a source of light whereby the light is substantially equally distributed to the indicating means without producing a glare.

Another object is to provide, as a new article of manufacture, a device for use in illuminating an indicating dial of an instrument whereby light may be introduced to the dial from a point source and the rays from the latter directed in a confined path adjacent the surface of the dial and in a plane substantially parallel to the dial and then deflected from the path and substantially evenly distributed over the surface of the dial.

Another object is to provide a novel device for use in illuminating an indicating surface such as a dial of an instrument whereby light may be introduced to the dial from a point source and the rays from the latter directed in a confined path adjacent the periphery of the dial and then deflected from the path and substantially evenly distributed from the periphery of the dial toward the center thereof and along its surface.

Another object is to provide a novel illuminating adapter whereby an optical device embodying the invention may be attached to a ready-built instrument mounted on a panel, for indirectly illuminating the dial of the instrument from an external source in the manner set forth above.

A further object is to provide, in combination with a source of light and an indicating dial or other indicating surface, a novel device for illuminating the dial or surface and comprising a transparent light directing member having its outer surface coated with a material which prevents light rays from emerging from the member but reflects them in the interior thereof, said member extending along a path adjacent the periphery of the dial and the coating of material covering the entire surface of said member except for a relatively narrow slit extending along said member on or near that side thereof which is adjacent said dial whereby light emerges from said slit and is directed onto said dial without producing glare and without permitting the light rays to be visible from the front of the dial. Preferably, though not necessarily, the slit is made to diverge along the surface of the member from the point or near the point at the end of said member at which light is introduced thereinto.

A still further object is to provide in an indicating instrument having a dial, novel means for indirectly illuminating the dial of said instrument and constituting an integral part of the assembled instrument, comprising an illuminating light conducting member of substantial length adjacent the plane of the dial, said member having its outer surface coated with a material which prevents light rays from emerging from said member, said coating of material covering substantially the entire surface of said member except for a relatively narrow slit extending along said member on that side thereof which is adjacent the dial whereby light emerges from said slit and onto said dial without producing glare and without permitting the rays to be visible from the front of the dial, and means for passing light through said member from one end thereof.

A further object of the invention is to provide a simple and inexpensive illuminated dial having a pointer or pointers, in which the pointers and/or the scale of the dial are clearly legible both when not illuminated and viewed by daylight, and when illuminated at night in accordance with the novel method of the invention.

Another object is to provide a dial having an indirectly illuminated scale or pointer(s) or both which appear to be in themselves sources of illumination when viewed in the dark.

Still another object of the invention is to provide a novel and simple illuminating adapter whereby the same may be easily attached to a ready-built instrument mounted on a panel by fastening screws and may be secured to the front of the instrument by the same screws which hold the instrument on the panel.

The above and other objects and advantages of the invention will appear more fully hereinafter from a consideration of the detailed description which follows, taken together with the accompanying drawing, wherein several embodiments of the invention are illustrated. It is to be expressly understood, however, that the drawing is for the purposes of illustration and description only and is not intended to define the limits of the invention, reference being had to the appended claims for this purpose.

In the drawing, wherein like reference characters refer to like parts throughout the several views;

Fig. 1 is a front view of an indicating instrument having one form of illuminating means embodying the present invention applied thereto as an adapter;

Fig. 2 is an enlarged cross-sectional view taken on line 2—2 of Fig. 1;

Fig. 3 is a sectional view taken on line 3—3 of Fig. 2; and

Fig. 4 is an exploded view of the illuminating adapter embodying the invention and removed from the instrument.

The invention consists substantially in the construction, combination, location and relative arrangements of parts for obtaining the results desired in accordance with the hereinbefore stated objects, as will be more fully hereinafter set forth in the specification, as shown in the drawing and as finally pointed out in the claims.

The basic combination of the present invention is, therefore, constituted by a dial which is preferably dark or black and having a white luminous scale and pointer or pointers, a glass or quartz member having a length sufficient to transmit light to all ponits of the dial or other surface on which characters are to be illuminated, said member having its outer surface coated with a material, or otherwise formed or treated, so as to prevent light from emerging therefrom, except on that side thereof which is adjacent to or faces the dial or surface so that a tapered clear surface is formed through which the light emerges and is directed toward the dial, and a light source disposed at one end of the rod, or between the ends thereof when bent into a geometrical form with the ends adjacent to each other, whereby light from the source is transmitted through the rod and reflected therefrom by the coated or roughened surface through the uncoated or smooth portion towards the dial. When the light conducting member is to be used for illuminating the dial of an indicating instrument, it may be built into and made an integral part of the instrument or as in the novel means comprising the present invention it may be made as a part of an adapter which may be secured to a ready-built instrument without having to take the instrument apart or even without removing the instrument from the panel if already mounted thereon. In the first case, the source of light or lamp would also be made a part of the complete instrument and in the second case, the lamp would be made part of the adapter. In either case, suitable means are provided for energizing the lamp.

Referring now to the drawing, the novel means of the present invention as shown in Figs. 1 to 4, inclusive, is embodied in an adapter for securing it to a ready-built instrument to illuminate the dial thereof, the instrument being shown, in the present instance, as an altimeter for use on aircraft. It is to be understood, of course, that the invention may be applied to any instrument having a dial provided with a contrasting scale and pointer or pointers which it is desired to illuminate or simply to any surface having characters which it is desired to illuminate.

The adapter, in the form shown, comprises an annular member 17 provided with fastening lugs 18, by means of which it may be secured to the indicating instrument at the lugs 19 (Fig. 1) of the instrument casing 20 (Fig. 2) by means of screws 21 which hold the instrument to the instrument panel 22. The member 17 conforms to the configuration of the periphery of the face of the instrument and although, in the present instance, it is shown as circular, it may take other geometric forms. If, for example, the instrument face were rectangular or triangular, the member 17 would have a corresponding shape. The annular member 17 is provided with an inturned flange 23 on its inner periphery to form a trough or recess 24. Within this trough or recess 24 is adapted to be placed a light conducting member which, in the present instance, is constituted by two semi-circular portions 25 and 26 so that when said portions are placed in recess 24 they form a substantially closed ring with their upper ends 27 and 28 spaced slightly apart for a purpose which will appear hereinafter, and the lower ends 29 and 30 are made to abut a separating member or lug 31 provided on the annular member 17 at the bottom thereof and within the recess 24.

The portions 25 and 26 of the light conducting member may be made as a single piece to constitute a ring as will be apparent from a consideration of other embodiments of the invention to be described hereinafter. In the present embodiment, however, the glass member is made in the two semi-circular portions 25 and 26 for the reason that the adapter is shown applied to an instrument in which a setting knob 32 is provided for setting the instrument for a certain desired condition and, hence, the adapter must be made so as to accommodate the knob.

It is to be understood, therefore, that the terms "light directing member," "glass or quartz member," "optical member," etc., used in this description and in the claims, are intended to include a member composed of two or more pieces held together, as well as a member constituted by a single piece and is intended to cover any light conducting material.

When the semi-circular portions 25 and 26 are placed in the recess 24, they are held therein by means of a retaining ring 33 which is adapted to be secured to the annular member 17 by means of screws 35 (Fig. 4). A shield 36 is provided at the ends 27 and 28 of the portions 25 and 26 and is held in place by the retaining ring 33 when the latter is secured to the annular member 17. The annular member 17 is provided with a lamp receiving receptacle generically designated as 37, wherein is mounted the insulating member 37a which separates and maintains the contacts 37b and 37c in their proper respective positions.

A lamp socket 38 is provided with a screw threaded part 39 and a projecting part 39a, which parts are electrically insulated from each other and cooperate respectively with contacts 37b and 37c to which current is led by conductors 37d and 37e respectively whereby the filament of a small incandescent lamp 40 is heated to incandescence. When the lamp socket 38 is placed into the receptacle 37 and screwed therein by means of the threads 39, the lamp 40 extends into the recess 24 and between the ends 27 and 28 of the semi-circular glass or quartz members 25 and 26 so that light from the lamp 40 enters said members at said ends.

The outer surfaces of the members 25 and 26 are, in the present embodiment, roughened and then coated with a suitable reflecting and opaque material as shown at 41, but on one side of said members the surfaces are left clear to form light emitting slits 42 and 43 which are preferably tapered as shown so that said slits are narrowest at the ends 27 and 28 where the light enters the members 25 and 26 and are widest at the ends 29 and 30. The slits 42 and 43 are so located with respect to the periphery of the cross-sections of the members 25 and 26 that they are not covered by the retaining ring 33, i. e., they are nearer the inner periphery of said members so that when the adapter is secured to the instrument casing 20, the light rays are emitted at all angles from 15 degrees to 45 degrees to the plane of the members 25 and 26 instead of right angles thereto.

The receptacle 37 is provided with a plug 44 which is adapted to cooperate with a jack (not shown) for connecting the lamp 40 to a suitable source of electrical energy (not shown) when the adapter is secured to the instrument casing 20, a hole being provided in the panel 22 for permitting said plug 44 to pass therethrough as shown in Fig. 2. Thus, it will be seen that when the adapter is assembled with the light conducting members 25 and 26 held in the receptacle 24 of the annular member 17 by the retaining ring 33 and the annular member 17 is secured to the instrument lugs 19 by means of the adapter lugs 18 and screws, and the lamp socket 38 is in the receptacle 37 and electrically connected to a suitable source by means of the plug 44, light from the lamp 40 will enter the light conducting members 25 and 26 at their ends 27 and 28 and will be transmitted along a light-restricting path defined by the length, cross-section and shape of said members 25 and 26, and will be reflected in said members by the inner surface of the coating material 41 and will be prevented from emerging from said members except at the tapered slits 42 and 43 from which it will be directed towards the instrument through the cover glass 45 thereof and onto the dial 46 having a scale 46a with which the pointers 47 and 48 (Fig. 1) of the instrument cooperate. As previously pointed out, the dial 46 is preferably dark or black and the scale 46a and pointers 47 and 48 are white, preferably coated with a luminous substance such as radium paint.

The members 25 and 26 are positioned adjacent the periphery of the dial 46 and the light from the slits 42 and 43 is emitted at an angle to the plane of the dial 46. The light is distributed from the periphery of the dial toward its center and, since the slits 42 and 43 are tapered, the light intensity is substantially equal over the entire scale of the dial because less light is emitted through the slit where the intensity is greatest and more light is emitted where the intensity is less, i. e., the intensity is greatest at the ends 27 and 28 of said members 25 and 26 and, therefore, the slits are narrowest at the ends, whereas the intensity is the least at the ends 29 and 30 and, therefore, the slits 42 and 43 are widest at this point. Thus, the amount of light emitted from the members 25 and 26 at any two points of the slits 42 and 43 throughout their lengths is substantially equal for the reason that the amount of light emitted is substantially equal to the product of the emitting area and the intensity. Hence, by tapering the slits, the product of intensity and emitting area remains constant, thereby providing uniformity of illumination.

The surface 41 is preferably a roughened surface which is then silvered, as by painting with silver paint or by silvering in the manner that mirrors are silvered so that on the inside of the members 25 and 26 a high degree of reflection of light is obtained without permitting the light to emerge from said members except at the slits 42 and 43. The shield 36 is to shield the lamp 40 as shown in Fig. 3 and thereby prevent light from being emitted from the adapter anywhere except at the slits provided for the purpose. The shield also aids to concentrate all the light into the ends 27 and 28 of the members 25 and 26.

There are thus provided novel means for indirectly illuminating an indicating dial of an instrument or other indicating device whereby the light is substantially equally distributed to the dial without producing glare and without rendering the light source or any rays therefrom visible from the front of the dial. There is also provided, as a new article of manufacture, a novel optical member for use in illuminating a dial whereby light may be introduced to the dial from a point source and the rays from the latter directed in a confined path adjacent the dial and then reflected from said path out of said optical member and then substantially evenly distributed over the surface of the dial to illuminate the latter together with the pointer if one be provided. There is further provided a novel illuminating adapter which may be attached to a ready-built instrument mounted on a panel for indirectly illuminating the dial of the instrument from an external source.

Although several embodiments of the invention have been illustrated and described by way of example, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. An illumination adapter for an already completed indicating instrument having a dial to be illuminated, comprising a member adapted to be secured to the front face of the instrument and circumscribing the periphery thereof, said member having a recess on the side which is to be placed against the instrument and extending substantially along the entire length of said member, means forming a lamp receiving opening extending from the outer periphery of said member and terminating in said recess, an electric lamp secured in said opening and projecting into said recess, a light conducting member seated in said recess and extending therealong but having separated ends between which the lamp extends whereby light rays from the lamp are directed into said member through said ends, said member being hidden from view from the front of the instrument by the adapter when the latter is secured to the instrument, a coating of reflecting and opaque material covering the surface of said member but forming a light emitting slot along said member and on that side thereof which is adjacent the dial of the instrument when the adapter is secured thereto whereby the light rays from the lamp enter the glass member through its ends and are confined in and conducted along a path defined by the contour of said glass member but are reflected out of said member through the slot in the coating in a direction toward the dial, means on said adapter for connecting the lamp to a current source, and means for attaching said adapter to the instrument.

2. An illumination adapter for an already completed indicating instrument having a dial to be illuminated, comprising a member adapted to be secured to the front face of the instrument and circumscribing the periphery thereof, said member having a recess on the side which is to be placed against the instrument and extending substantially along the entire length of said member, means forming a lamp receiving opening extending from the outer periphery of said member and terminating in said recess, an electric lamp secured in said opening and projecting into said recess, a light conducting member seated in said recess and extending therealong but having separated ends between which the lamp extends whereby light rays from the lamp are directed into said member through said ends, said member being hidden from view from the front of the instrument by the adapter when the latter is secured to the instrument, a coating of opaque material covering the surface of said member but forming a light emitting slot along said member and on that side thereof which is adjacent the dial of the instrument when the adapter is secured thereto whereby the light rays from the lamp enter the glass member through its ends and are confined in and conducted along a path defined by the contour of said glass member but are reflected out of said member through the slot in the coating in a direction toward the dial, said light emitting passage being relatively narrow near the ends of said glass member and increasing in width as it extends further away from said ends whereby the amount of light emitted from said passage is substantially constant throughout the periphery of said glass member, means on said adapter for connecting the lamp to a current source, and means for attaching said adapter to the instrument.

3. An illumination adapter for an indicating instrument having a dial to be illuminated, comprising a member adapted to be secured to the front face of the instrument and circumscribing the periphery thereof, means for securing said member to said instrument along the periphery thereof, light receiving and distributing means surrounded by said member and held in place thereby in cooperative position with said instrument, a cylindrical internally threaded electrical lamp receptacle formed in said member and accessible from the front thereof, said receptacle being open at both ends thereof, a miniature electric lamp adapted for insertion from the front of said adapter into said receptacle through the outer open end thereof, said lamp comprising a base having a finger-operable portion remaining outside of the receptacle and an externally threaded portion extending from said finger-operable portion for engagement with the internally threaded receptacle, an electric lamp bulb projecting from said externally threaded portion of said base whereby upon insertion of said lamp into said receptacle said lamp projects towards said light receiving means, means including a plug on said member electrically connected to said lamp receptacle and projecting from said adapter for insertion into a socket for connecting said lamp to a current source whereby the light from said lamp may be used to illuminate the dial of said instrument from the front thereof.

4. An illumination adapter for an indicating instrument having a dial to be illuminated, comprising a member adapted to encircle said instrument, means for securing said member to said instrument along the periphery thereof, light receiving and distributing means surrounded by said member, a cylindrical internally threaded electrical lamp receptacle formed in said member and accessible from the front thereof, said receptacle being open at both ends thereof, a miniature electric lamp adapted for insertion from the front of said adapter into said receptacle through the outer open end thereof, said lamp comprising a base having a finger-operable portion, an externally threaded portion and a bulb portion, said finger-operable portion remaining outside said receptacle, said threaded portion cooperating with said threaded receptacle to hold said lamp in place and said bulb portion projecting into proximity with said light receiving means.

5. An illumination adapter for a ready-built indicating instrument having a casing and a dial therein to be illuminated, said adapter comprising a frame adapted to be secured to the front of the instrument casing and circumscribing the periphery thereof, said frame having a recess on the side which is to be placed against the instrument and extending substantially along the entire peripheral length of said frame, means providing a transversely extending lamp-receiving opening in said frame and terminating at said recess, an electric lamp secured in said opening and projecting toward said recess, a solid transparent light-conducting member in said recess in cooperative and light-conducting relation with said lamp, a coating of light-reflecting material on said light-conducting member so arranged as to reflect the light from said member onto the dial of the instrument, means on said frame for connecting said lamp to a current source, and means for attaching said frame to the instrument casing.

6. An illumination adapter for an indicating instrument having a dial to be illuminated, comprising a frame adapted to surround said instrument, means for securing said frame to said instrument along the periphery thereof, light receiving and distributing means surounded by said frame, an internally threaded electrical lamp receptacle formed in said frame and accessible from the front thereof, a miniature electric lamp adapted for insertion from the front of said adapter into said receptacle, said lamp comprising a base having a finger operable portion, an externally threaded portion and a bulb portion, said finger operable portion remaining outside of said receptacle, said threaded portion cooperating with said threaded receptacle to hold said lamp in place, and said bulb portion projecting into proximity of said light receiving means.

7. An illumination adapter for an indicating instrument having a casing and a dial therein to be illuminated, comprising a frame adapted to surround said casing and to be secured to the front thereof, means for securing said frame to the front of said casing, an electric lamp receptacle carried by said frame and adapted to mount a miniature electric lamp at one side of said instrument at the periphery of the casing, a miniature electric lamp adapted for insertion into said receptacle from the front of said adapter and comprising a base having a bulb portion projecting into said receptacle and a finger operable portion remaining outside of said receptacle, and a transparent light receiving and distributing member disposed to receive light from said lamp and having a surface arranged to reflect said light onto said dial, said frame having a contour like that of the front of the instrument casing, whereby said adapter can be applied to an instrument casing for illuminating the dial without changing the front contour of the instrument and without changing the mounting or operating mechanism of the instrument.

8. An illumination adapter for an indicating instrument having a casing and a dial therein to be illuminated, comprising a frame adapted to surround said casing and to be secured to the front thereof, means for securing said frame to the front of said casing, an electric lamp receptacle carried by said frame and adapted to mount a miniature electric lamp at one side of said instrument at the periphery of the casing, a miniature electric lamp adapted for insertion into said receptacle from the front of said adapter and comprising a base having a bulb portion projecting into said receptacle and a finger operable portion remaining outside of said receptacle, a transparent light receiving and distributing member disposed to receive light from said lamp and having a surface arranged to reflect said light onto said dial, said frame having a contour like that of the front of the instrument casing, whereby said adapter can be applied to an instrument casing for illuminating the dial without changing the front contour of the instrument and without changing the mounting or operating mechanism of the instrument, and means on said frame for connecting the lamp receptacle to a source of electrical energy.

GREGORY V. RYLSKY.